United States Patent
Solarz et al.

(10) Patent No.: US 9,735,534 B2
(45) Date of Patent: Aug. 15, 2017

(54) SUB 200NM LASER PUMPED HOMONUCLEAR EXCIMER LASERS

(71) Applicant: KLA-Tencor Corporation, Milpitas, CA (US)

(72) Inventors: Richard W. Solarz, Danville, CA (US); Ilya Bezel, Mountain View, CA (US); Anatoly Shchemelinin, Bozeman, MT (US)

(73) Assignee: KLA-Tencor Corporation, Milpitas, CA (US)

(*) Notice: Subject to any disclaimer, the term of this patent is extended or adjusted under 35 U.S.C. 154(b) by 0 days.

(21) Appl. No.: 14/571,100

(22) Filed: Dec. 15, 2014

(65) Prior Publication Data
US 2015/0168847 A1    Jun. 18, 2015

Related U.S. Application Data (60) Provisional application No. 61/917,339, filed on Dec. 17, 2013.

(51) Int. Cl.
| | |
|---|---|
| *H01S 3/094* | (2006.01) |
| *H01S 3/22* | (2006.01) |
| *H01S 3/225* | (2006.01) |
| *H01S 3/0941* | (2006.01) |
| *H01S 3/036* | (2006.01) |

(52) U.S. Cl.
CPC ........... *H01S 3/094* (2013.01); *H01S 3/225* (2013.01); *H01S 3/2207* (2013.01); *H01S 3/036* (2013.01); *H01S 3/0941* (2013.01); *H01S 3/094042* (2013.01); *H01S 3/094053* (2013.01)

(58) Field of Classification Search
CPC .......................... G03F 7/70058; H01S 3/094
USPC ............................ 372/5, 25, 59, 76; 355/67
See application file for complete search history.

(56) References Cited

U.S. PATENT DOCUMENTS

| | | | |
|---|---|---|---|
| 4,177,435 A | 12/1979 | Brown | |
| 7,106,776 B1 | 9/2006 | Sorokin et al. | |
| 2008/0267241 A1* | 10/2008 | Brown | G03F 7/70025 372/55 |

(Continued)

FOREIGN PATENT DOCUMENTS

| | | | |
|---|---|---|---|
| WO | 2012154468 A2 | 11/2012 | |
| WO | WO2012-154468 | * 11/2012 | H01S 3/10 |

OTHER PUBLICATIONS

"International Application Serial No. PCT/US2014/070656, Search Report mailed Apr. 13, 2015", 3 pgs.

(Continued)

*Primary Examiner* — Tuan Nguyen
(74) *Attorney, Agent, or Firm* — Kwan & Olynick LLP (57) ABSTRACT

Disclosed are methods and apparatus for generating a sub-200 nm continuous wave (cw) laser. A laser apparatus includes a chamber for receiving at least a rare gas or rare gas mixtures and a pump laser source for generating at least one cw pump laser focused in the chamber for generating at least one laser-sustained plasma in the chamber. The laser apparatus further includes a system for forming an optical cavity in which the at least one laser-sustained plasma serves as an excitation source for producing at least one cw laser having a wavelength that is below about 200 nm. In one aspect, the at least one laser-sustained plasma has a shape that substantially matches a shape of the optical cavity.

21 Claims, 6 Drawing Sheets

(56) References Cited

U.S. PATENT DOCUMENTS

2011/0181191 A1* 7/2011 Smith .................... B82Y 10/00
315/149
2012/0213236 A1* 8/2012 Lundquist ............. H01S 3/0604
372/25
2014/0111799 A1* 4/2014 Lei .................... G01N 21/9501
356/237.5

OTHER PUBLICATIONS

Kaku, Masanori et al., "Vacuum ultraviolet Ar2 excimer excited by an ultrashort pulse high intensity laser", Proceedings of SPIE, vol. 5120, 2003, 12 pgs.
Kaku, Masanori et al., "Vacuum ultraviolet argon excimer production by use of an ultrashort-pulse high-intensity laser", Physical Review, A 68, 023803, 2003, 6 pgs.

* cited by examiner

SUB 200NM LASER PUMPED HOMONUCLEAR EXCIMER LASERS

CROSS-REFERENCE TO RELATED APPLICATION

This application claims priority of U.S. Provisional Patent Application No. 61/917,339, entitled Sub 200 nm Laser Pumped Homonuclear Excimer Lasers, filed 17 Dec. 2013 by Richard W. Solarz et al., which is herein incorporated by reference in its entirety for all purposes.

TECHNICAL FIELD OF THE INVENTION

The invention generally relates to a field of wafer and reticle inspection. More particularly the present invention relates to apparatus and techniques for providing coherent continuous wave (cw) light sources having a wavelength below 200 nm.

BACKGROUND

Generally, the industry of semiconductor manufacturing involves highly complex techniques for fabricating integrating circuits using semiconductor materials which are layered and patterned onto a substrate, such as silicon. An integrated circuit is typically fabricated from a plurality of reticles. Generation of reticles and subsequent optical inspection of such reticles have become standard steps in the production of semiconductors. Initially, circuit designers provide circuit pattern data, which describes a particular integrated circuit (IC) design, to a reticle production system, or reticle writer.

Due to the large scale of circuit integration and the decreasing size of semiconductor devices, the reticles and fabricated devices have become increasingly sensitive to defects. That is, defects which cause faults in the device are becoming increasingly smaller. The device can generally be required to be fault free prior to shipment to the end users or customers.

Various inspection systems are used within the semiconductor industry to detect defects on a semiconductor reticle or wafer. One type of inspection tool is an optical inspection system. In optical inspection systems, one or more radiation beams are directed towards the semiconductor wafer or reticle and a reflected and/or scattered beam is then detected. The detected beam is used to then generate a detected electrical signal or an image, and such signal or image is then analyzed to determine whether defects are present on the wafer.

Lasers are also used as light sources in many inspection systems to measure defects on reticles or wafers. Lasers provide light with high brightness and can provide a collimated beam of light that can be directed easily through lenses and toward the sample. Additionally, laser sources with a short wavelength, e.g., below 200 nm, may be advantageously used for examining relatively small feature sizes.

There is a continuing need for improved inspection techniques and apparatus having sub-200 nm light sources.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A laser apparatus for generating continuous wave (cw) coherent output radiation having a wavelength below about 200 nm is disclosed. The apparatus includes a chamber for receiving at least a rare gas or rare gas mixtures and a pump laser source for generating at least one cw pump laser focused in the chamber for generating at least one laser-sustained plasma in the chamber. The apparatus further includes a lens system for forming an optical cavity in which the at least one laser-sustained plasma serves as an excitation source for producing at least one continuous wave (cw) laser having a wavelength that is below about 200 nm.

In a specific implementation, the chamber is configured to receive and maintain the rare gas or rare gas mixtures at a pressure that is above about 10 bars. In another aspect, the rare gas or rare gas mixture comprises one or more of the following gases: Xe, Kr, or Ar. In yet another example, the pump laser source and the lens system are arranged to produce the cw laser from excimer emissions of the at least one plasma. In another implementation aspect, the laser apparatus further includes a lasing medium positioned in the optical cavity. In this aspect, the lasing medium is arranged so that excimer excited states are used to collisionally transfer energy to excited atomic states to produce the cw laser from the lasing medium. In another example, the cw laser has an ultraviolet (UV) or vacuum UV wavelength.

In an alternative embodiment, the chamber is configured to receive and maintain the rare gas or rare gas mixtures at a pressure that is higher than about 10 atm. In another embodiment, the pump laser source has a wavelength greater than or equal to either about 0.8 to 0.9 µm or about 1 µm and an average power equal to or higher than 1 kW. In another embodiment, the pump laser source is a plurality of fiber bundles of incoherent diodes. In yet another implementation, the pump laser source is a plurality of fiber bundles of Yb based active media. In another aspect, the rare gas has at least a 51% relative fill pressure as compared to any heterodimeric gases in the chamber. In another embodiment, the laser apparatus includes a pump for flowing the rare gas or rare gas mixtures through the chamber.

In another implementation, the pump laser source and the lens system for forming the optical cavity are arranged to produce the cw laser from excimer emissions of the at least one plasma. The optical cavity is formed by a first mirror formed from materials that transmit wavelengths equal to or higher than the cw pump laser's wavelength and have a high reflectivity at wavelengths that include at least a portion of a wavelength range of the excimer emission and a second mirror formed from materials that have a reflectivity at wavelengths that include at least a portion of the wavelength range of the excimer emissions.

In another embodiment, the pump laser source and the lens system for forming the optical cavity are arranged to produce excimer emissions in the at least one laser-sustained plasma by having a small signal single pass gain of at least 0.2. In a further aspect, the gain is based on a concentration number of an excited population times an emission cross section times a length of the optical cavity and active laser medium having a range above 2.

In another implementation, the optical cavity has a length between about 1 mm and 10 cm and a diameter having a range of about 100 µm to 3 mm. In a further aspect, the at least one laser-sustained plasma has a shape that substantially matches a shape of the optical cavity. In yet a further example, the laser apparatus includes a second chamber having an orifice. In this aspect, the first chamber is configured to have a first pressure and the second chamber is configured to have a second pressure that is substantially lower than the first pressure so as to cause extrusion of an extruded portion of the at least one laser-sustained plasma from the first chamber, through the orifice, to the second chamber. In this aspect, the lens system for forming the optical cavity is positioned in the second chamber so as to receive the extruded portion. In one example, the first pressure is above about 10 bars and the second pressure is below about 1 torr, and the orifice has a diameter between about 30 to 200 µm. In another aspect, the pump laser source includes a plurality of fiber bundles for generating a plurality of cw lasers for forming a plurality of laser-sustained micro-plasmas aligned along the length of the optical cavity. In another implementation, the lens system for forming the optical cavity includes one or more line-narrowing elements.

In another embodiment, the invention pertains to an inspection system for inspecting a photolithographic reticle or wafer for defects. The inspection system includes a laser apparatus as described in any of the above embodiments and imaging optics for directing the output beam towards a reticle or wafer. This system also includes a detector for receiving a detected signal or image in response to the output beam being reflected from or transmitted through the reticle or wafer in response to the output beam being reflected or scattered from the reticle or wafer and a processor and memory that are configured to analyze the detected signal or image to thereby detect defects on the reticle or wafer.

In another embodiment, the invention pertains to a photolithography system for transferring a pattern from a reticle onto a wafer. The photolithography system includes a laser apparatus as described in any of the above embodiments and imaging optics for directing the output beam through a reticle onto a wafer.

In an alternative embodiment, the invention pertains to a method of generating output radiation having a wavelength below about 200 nm. At least one laser-sustained plasma is generated so as to cause excimer emissions within a laser cavity. An excimer laser is output from the laser cavity based on the excimer emissions. The excimer laser is directed towards a semiconductor sample. The semiconductor sample is inspected based on output light that is reflected or scattered from the semiconductor sample in response to the excimer laser on the semiconductor sample.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known component or process operations have not been described in detail to not unnecessarily obscure the present invention. While the invention will be described in conjunction with the specific embodiments, it will be understood that it is not intended to limit the invention to the embodiments.

Introduction

Sub 200 nm lasers, particularly cw (continuous wave) lasers of high power, are highly desirable for the inspection of silicon based semiconductor wafers. Often materials used in semiconductor laser fabrication possess reflectivities and absorption lengths which remain favorable for chip inspection down to 90 nm and to wavelengths as short as even 50 nm. Since the sensitivity of wafer inspection tools to defect detection is proportional to the inverse of the wavelength of the laser itself to a power law of at least one (depending on the particular application), short wavelength lasers are constantly being developed for this application. Furthermore, cw (rather than pulsed, whether q-switched, mode-locked, gain switched, or other pulsed format) is preferable, as the wafer damage is minimized with the application of cw light.

Much attention has recently been devoted to extending the wavelengths of solid state lasers to shorter wavelength regimes via harmonic conversion. In order to achieve high conversion efficiency, harmonic conversion may be obtained with nonlinear materials that phase match the fundamental and harmonic wavelengths. To optimize the drive of these nonlinear materials, external cavities can be arranged to contain the nonlinear material and to recirculate the fundamental or drive photons within the cavity. However, development of these materials over the last twenty years or more has not resulted in reliable (5000-20000 hour) devices, much over one watt. A sub 200 nm laser operating without the need for nonlinear materials is exceedingly desirable.

An excimer (originally short for excited dimer) is generally a short-lived dimeric or heterodimeric molecule formed from two species, at least one of which has completely filled valence shell of electrons (for example, noble gases). In this case, formation of such molecule is possible only if such atom is in an electronic excited state. Excimers can be used to generate short wavelength light.

Heteronuclear molecules and molecules that have more than two species are also called exciplex molecules (originally short for excited complex). Some excimer lasers are based upon a heteronuclear rare gas halide gain media, such as ArF, XeF, KrF, ArCl, and homologues, as well as F2, lasers. Unfortunately, excimers based on heteronuclear rare gas halide gain media can only produce pulsed lasers (and not cw), which operate at high per pulse energy by moderate repetition rates, e.g., up to approximately 4 kHz for those devices that are available commercially.

The underlying fundamental property that limits such excimer lasers, which are based upon rare gas halide gain media, to short pulses of moderate repetition rate are the chemical kinetics responsible for populating the upper lasing state, the bound excimer. One reason for these limitations is that the pathway for the formation of bound excimers in halide-based discharges is the harpoon reaction of negatively charged halide dimers with ionic states of the rare gas. These kinetic reactions result in the consumption of starting materials, gaseous halogen dimers, which are released as halide atoms in these reactions. Kinetic conversion of these resultant free atoms to negatively charged halide dimers or negatively charged halide ions is slow and cannot be overcome by the addition of more halide dimer in the initial mix, as such an addition quenches lasing. The kinetic chain consumes its own reactants, with the only solution for increasing repetition rate being to continuously flow the reactants to refresh the lasing region with new material. Pumping speed increases as the fourth power of the laser repetition rate, however, making this approach untenable. Thus, rare gas halide excimers and halide excimers are relegated to modest repetition rate short pulse formats.

Laser Pumped Homonuclear Excimer Lasers

Certain embodiments of the present invention provide homonuclear-based excimer laser generators that produce cw excimer UV (ultraviolet) and vacuum UV laser emission in which the gain region of the laser is achieved and sustained by creating a plasma with a high power cw excitation laser focused into a gas cell containing a high pressure (10 or more bars) of gases that can form excimers. Example homonuclear gases include diatomic rare gases, such as $Xe_2$, $Kr_2$, $Ar_2$, $Ne_2$, or mixtures thereof, etc. The addition of lighter rare gas atoms, such as helium or neon, to the mix may even accelerate the required kinetics.

Figure 1:
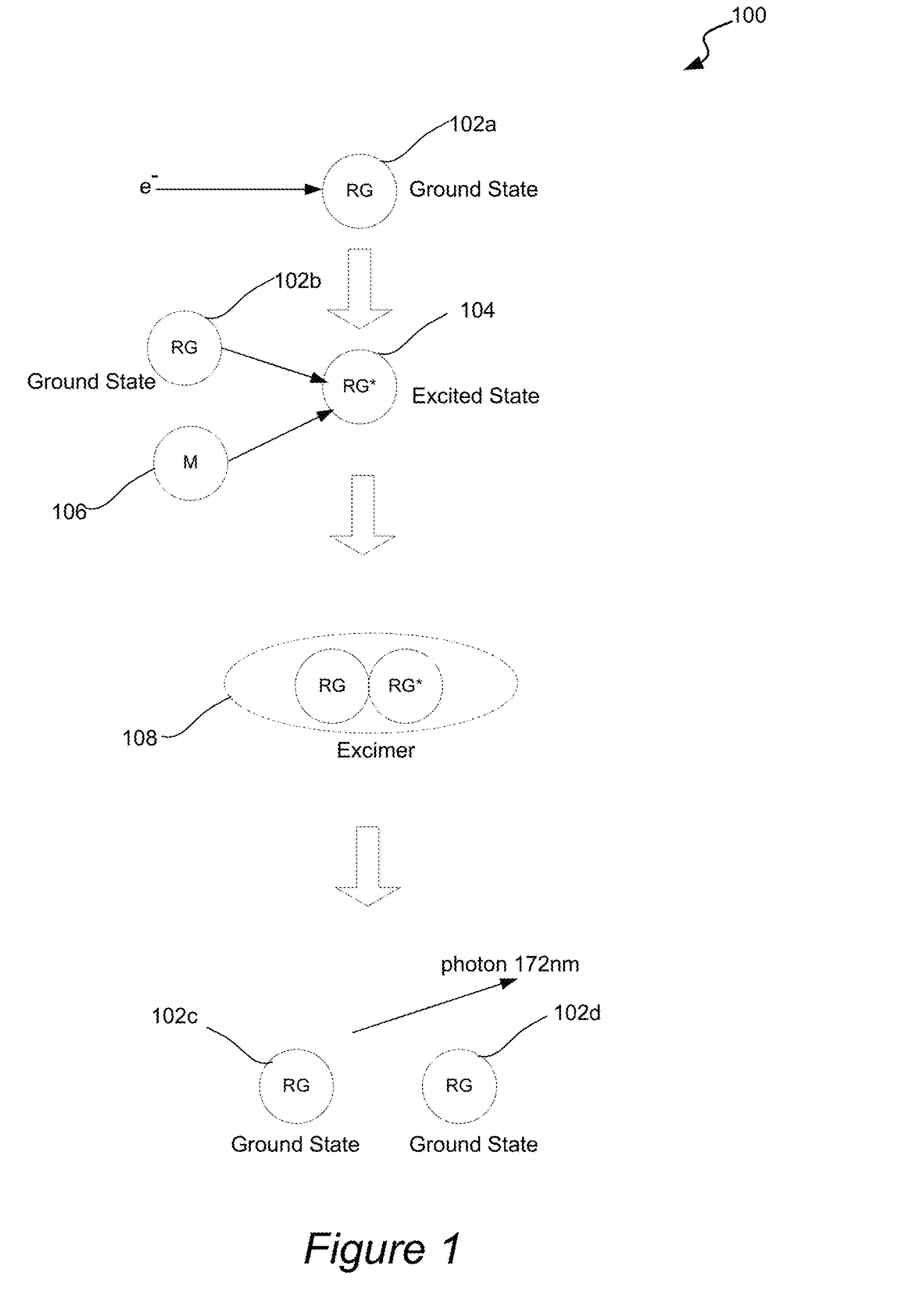
FIG. 1 is a diagrammatic representation of a process for generating a homonuclear-based excimer laser.

FIG. 1 is a diagrammatic representation of a process for generating an excimer laser from a homonuclear rare gas. As shown, a ground state rare gas (RG) atom 102a can be excited by an electron e⁻ to transition to an excited state rare gas (RG*) atom 104. The dominant reaction pathway for the formation of bound excited state excimers in homonuclear molecules is a three body collisions of, for example, two ground state rare gas atoms with one excited state atom or an ion of the rare gas material. In the example of FIG. 1, ground state RG 102b collides with excited RG* 104 and a third particle (M) 106 to form rare gas excimer 108. The third particle M can be another rare gas atom of the gas mixture, but not necessarily the same rare gas type as the RG or RG* atom. The excimer is short-lived and decays into two ground state atoms 102c and 102d, releasing a photon (e.g., 172 nm for Xe). When excited RG* 104 are formed in substantial concentrations at very high pressures, where three body collisions stabilize the resulting excimer, sufficient stored power can be obtained to sustain cw laser oscillation within a suitably designed laser cavity.

Numerous attempts have been made to form cw homonuclear diatomic excimers in sufficient concentration using electrical discharge excitation, as opposed to our preferred method of using laser pumps to excite the plasma. Due to the very high energy densities per storage lifetime required to sustain oscillation in these devices, of order 100 MW/cc or more, cw discharges are unstable and have been unsuccessful in providing sufficient stored energy (power) density to demonstrate cw laser oscillation. Typically, relativistic e-beam pump sources of tens of ns duration are used to form pulsed homonuclear diatomic excimer lasers, or cw electrical discharges are used to obtain incoherent radiation from these species.

The generated excimers can also be used to collisionally transfer their excitation to atomic excited states of species such as oxygen atoms, mercury atoms, or other atoms with strong emissions in the UV and VUV regions. These excited atomic states can be used as the lasing medium. In other words, atoms that generally become ions in the plasma can be used to extract from the excimers of all their energy and then themselves lase.

Another favorable feature in a homonuclear-based excimer approach may be that rare gas only, high pressure gas mixtures retain their excited state storage of energy, even to pressures of 15-18 atm or more or above 10 atm. This result is unlike rare gas halides, which typically operate at roughly an atm and have their fluorescence quenched at pressures that are much above a few atm. Thus, these cw homonuclear excimers can compensate for their lower stimulated emission cross sections by having higher gas pressure and, therefore, higher gain capability.

Figure 2:
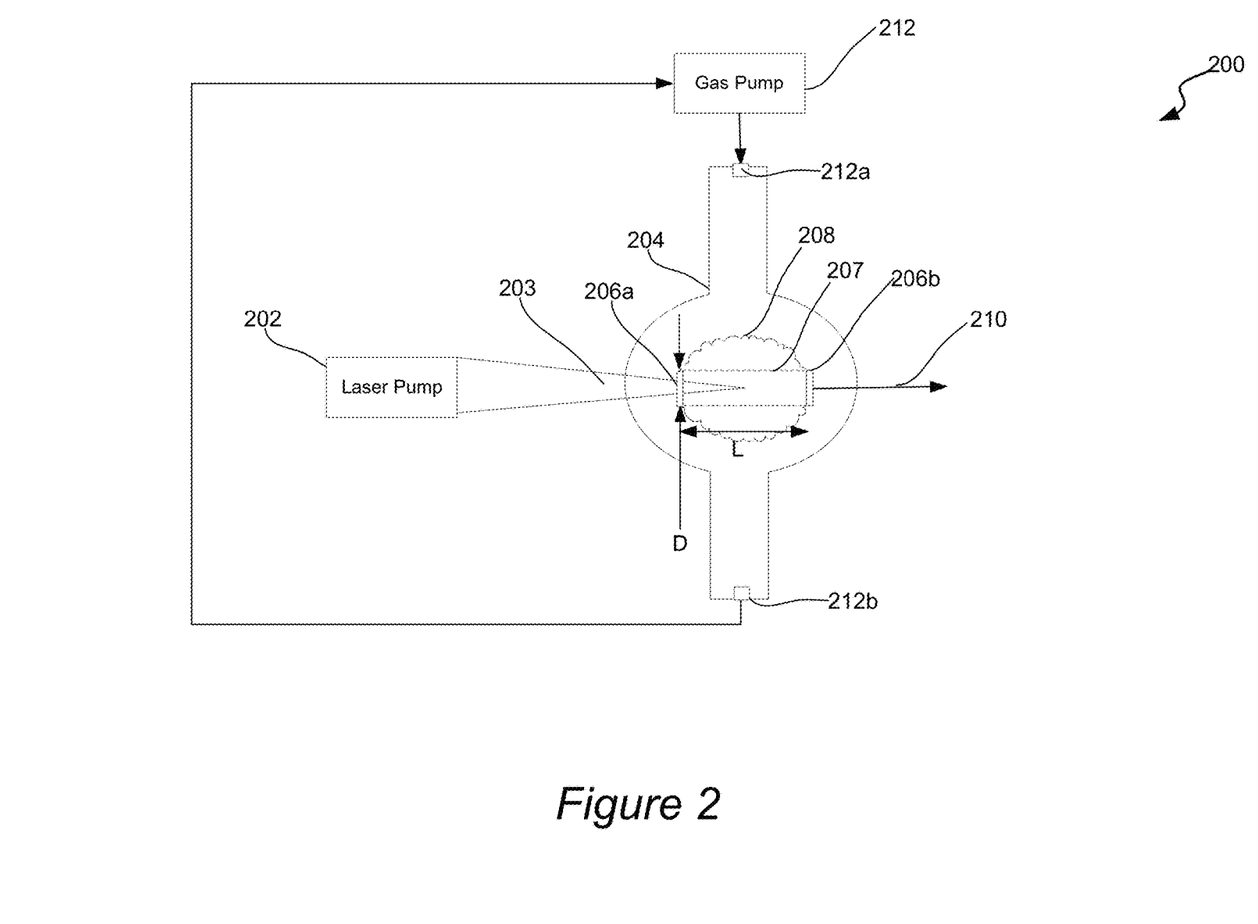
FIG. 2 is a more detailed representation of an excimer laser generator in accordance with a first implementation of the present invention.

FIG. 2 is a more detailed representation of an excimer laser generator 200 in accordance with a first implementation of the present invention. As shown, the system excimer laser system 200 may include laser pump 202 for generating and focusing a cw laser beam 203 having a high average power, such as a 0.8 to 0.9 μm laser or a 1 μm laser with an average power rating of about 1~3 kW or higher (or equal to or higher than 1 kW). In specific embodiments, the laser pump 202 can be in the form of fiber bundles of incoherent diodes, fiber bundles of Yb based active media, etc. In the case of the incoherent diodes, the fiber bundle is passive and only transports the diode radiation to the end of the coupler. In this example, the diodes can be near infrared wavelengths of powers near and above one kW. For the Yb based laser, multiple pump diodes can be coupled to each fiber, which is glass doped with Yb. Both sources of fiber (passive) or fiber (active) bundles may have cw powers ranging near or above about 1 kW to as many as 30 kW. The glass doped fiber absorbs the light (e.g., 0.8 micron diode light) and converts it to, for example, 1 micron fiber light. In the Yb approach, the emission coming from each fiber is incoherent with respect to each other. The Yb wavelength has the advantage of never drifting so that the resulting laser-pumped plasma can be more stable in time.

In one example, the excimer laser generator 200 includes a chamber 204 that is filled with at least a rare gas or mixture as described herein. In one embodiment, the rare gas has a relative fill pressure that is greater than or equal to 51% of the gas contained in the chamber. For example, the chamber contains a gas in which the relative fill pressure of the minority constituent is between 1 and 49 percent.

The pressure in this chamber 104 can have a range of about 10 to 40 bar. Once the chamber 204 is filled with gas via gas pump 212 through inlet valve 212a to achieve a particular pressure, the inlet valve 212a may then be closed to form a static gas in chamber 204. The chamber 204 may have any suitable shape, such as a bulb shape. In alternative embodiments, gas pump 212 may circulate the gas in through inlet 212a, through the chamber, and out through outlet valve 212b, to form a flow of gas that is perpendicular to the optical cavity.

The focused laser 203 passes through or around a first mirror 206a to focus on the substantially homonuclear gas contained in the chamber 204 to thereby form a plasma 208. This first mirror 206a is formed from materials that transmit wavelengths equal to or higher than the pump laser's wavelength, such as equal to or higher than about 1 μm. This first mirror 206a also has a high reflectivity at wavelengths that include at least a portion of the wavelength range of the excimer emissions, e.g., between approximately 165 and 175 nm for $Xe_2$*. The first mirror 206a may have different reflectivity ranges when other homonuclear gases having different excimer emission wavelengths are used.

The first mirror 206a is arranged with respect to a second mirror 206b so as together form a laser cavity 207 for the photons produced in the excimer emission. The second mirror 206b is formed from materials that have a reflectivity greater than or equal to about 90% for the expected excimer wavelength (e.g., 171 nm). An excimer-produced laser 210 is output from the optical cavity 207.

Regardless of the particular embodiment, the mirrors of the optical cavity can form confocal or even unstable resonators to provide feedback to the active media. That is, the mirrors can have radii of curvatures (R1 and R2) that are both above the length L for confocal cavities. Other types of resonators, such as unstable resonators, may be formed.

In general, an excimer-produced laser 210 can be achieved from a homonuclear gas when an inversion in the excited population occurs, e.g., the excited population is greater than the lower state population. The small signal gain is simply:

$$N^*\sigma L$$

where $N^*$ is the concentration (number per volume) of the excited state population of material that is present in the laser cavity in which the laser is to be produced; $\sigma$ is the emission cross section; L is the path length of the laser cavity or plasma 208 formed by the lasing process. Said in another way, $N^*$ is the excited state population density that is seen by each photon, which is characterized by the number density of the excited states, while $\sigma$ is the stimulated emission cross section of the plasma in the laser cavity.

The result of $N^*\sigma L$ is desired to generally be greater than about 20%/L(cm) or 0.2 to result in a excimer produced laser. As an example, $N^*\sigma L$ has a range of 2 or more. An $n^*\sigma L$ equal to 2 means that every photon that is produced by the excimer emission stimulation between the first and second mirrors causes 2 more photons to be generated. A sufficiently high value is desired to compensate for any photon loss that may occur as the laser travels through the cavity. Photon loss may be caused by reabsorption at the illumination mirrors, diffraction around the mirrors, etc.

By way of example, $\sigma$ is about $8\times10^{-18}$ cm$^2$±10% for Xe$_2$*. A laser cavity mode will have a particular cross section diameter D, such as about 200 µm for a transverse electromagnetic mode (TEM$_{00}$) laser. In the illustrated embodiment, the plasma 208 is sphere shaped and will have diameter above this laser cross section D in order to also cover the length L of the optical cavity. However, sphere-shaped plasma 208 is going to have excimer emission regions that do not contribute to formation of the excimer laser in the optical cavity.

Mirrors (e.g., 206a and 206b) can be positioned in the chamber 204 to achieve a laser cavity length L that is as long as practical. For instance, the mirrors are arranged with respect to each other to form a length L that is between about 3 mm and 10 cm.

In the illustrated example in FIG. 2, a laser sustained plasma forms roughly into the shape of a sphere. A laser cavity usually extracts radiation from a volume shaped like a pencil or a cylinder with a fairly small radius (of order hundreds of microns) and the length is the separation between the two cavity mirrors. In an alternative embodiment, the plasma can be shaped by the components of the laser generator to achieve a cylinder or pencil shaped plasma of excimer excitation so as to more closely match the shape of the optical cavity. For example, the plasma can be shaped into a cylindrical geometry by extruding it through an orifice in a differentially pumped vacuum chamber, in order to more favorably match the excimer gain volume to the optical cavity formed by the laser mirrors. Greater laser efficiency can, thus, be achieved using the property that the upper level of the gain media persists (or, more precisely, is continuously produced) in a volume which coincides with that of the laser cavity optical mode.

Certain embodiments of the present invention include mechanisms for generating a plasma geometry to more closely match the laser cavity. That is, one or more laser sustained plasmas are used as excitation sources for cw excimer lasers in which the geometry of such multiple plasmas have a total length of about 1 mm to 10 cm and a diameter in the range of about 100 µm to a few mm.

Figure 3:
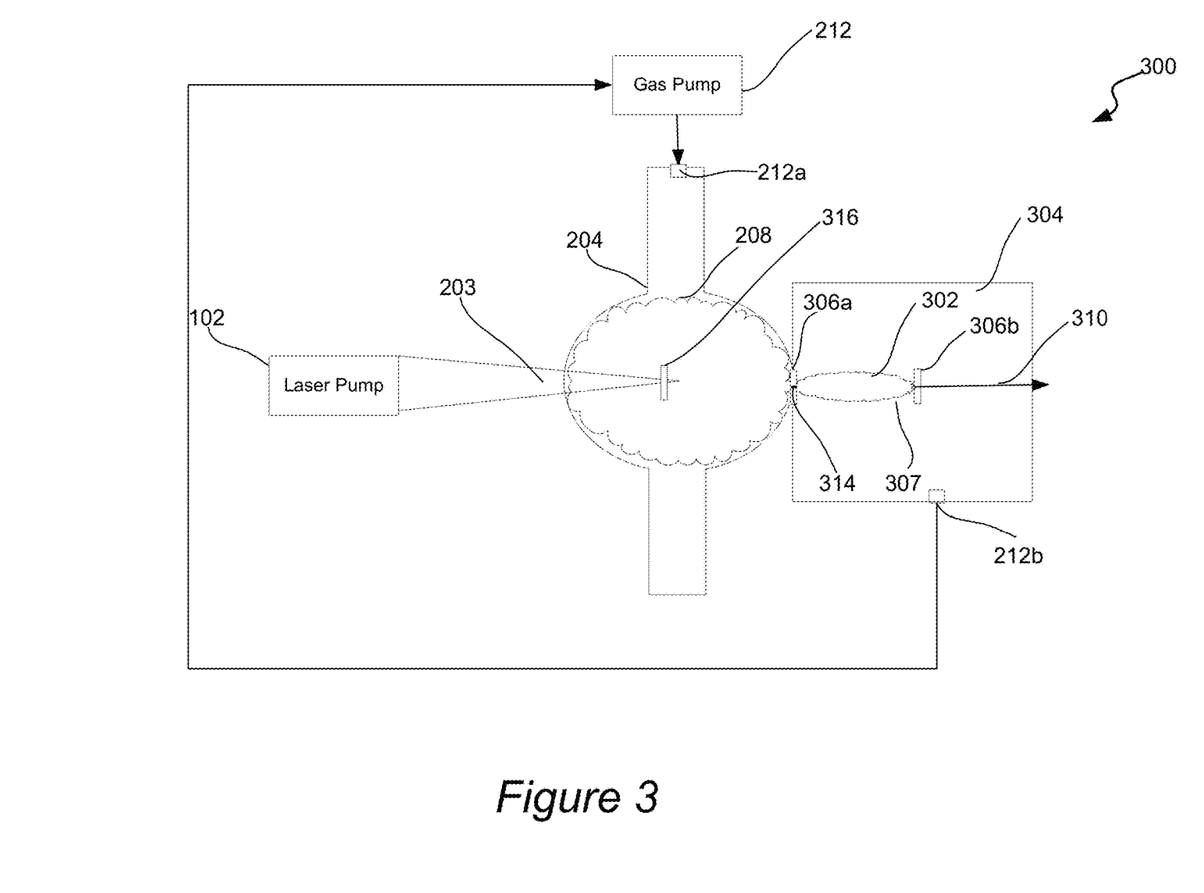
FIG. 3 is a diagrammatic representation of an excimer laser source generator in accordance a second implementation of the present invention.

FIG. 3 is a diagrammatic representation of an excimer laser source generator in accordance an alternative implementation of the present invention. Components with the same reference as components of FIG. 2 can have the same configuration or operation as described above. As shown, first chamber 204 is adjoined to second chamber 304, which is held at a substantial vacuum (e.g., 1 torr or less). The first chamber 204 can be any suitable shape, e.g., rectangular like the second chamber 304. Differential pumping can be achieved, for example, via inlet 212a for the first chamber to add gas to a specified pressure and via outlet 212b to evacuate gas from the second chamber 304.

First and second mirrors 306a and 306b form the optical cavity into which a plasma portion 302 is extruded through orifice 314 in the first and second abutted chamber walls, as well as the first minor 306a. That is, the plasma 208 leaks and supersonically expands from the high pressure chamber 204 via the orifice 314 to the second low pressure chamber 304, which is differentially pumped. The extruded plasma 302 can be about 1 cm in length, which is enough to form excimer gain length product between minors 306a and 306b to produce excimer laser 310.

In this embodiment, the plasma persists as a hot plasma and retains the gain even for periods of microseconds after it is no longer directly at the focal point of the pump laser (e.g., tens of microseconds). Accordingly, when a large laser plasma is generated in a high pressure chamber (10 bars or more), an orifice at one side of such chamber can allow the gas to supersonically expand into a low pressure chamber (1 torr or less) at the other side of the wall in which the orifice or hole is formed as shown in FIG. 3. In a specific implementation, the orifice has a diameter of between about 30 to 200 µm.

Any of the laser generating systems described herein can also include one or more line-narrowing elements, such as prisms or etalons (e.g., 316), in the lasing cavity to produce narrow line emission in which narrow is defined as any bandwidth that is less than one half of the incoherent excimer fluorescent emission line width.

Figure 4:
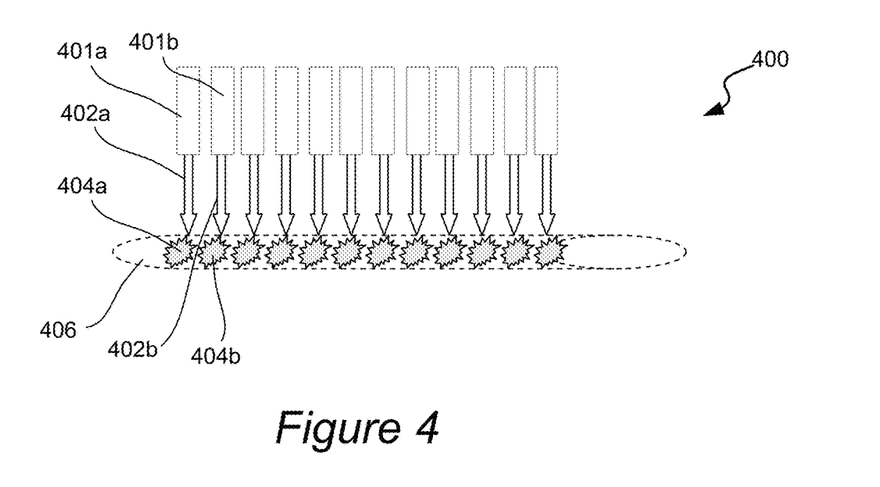
FIG. 4 is a diagrammatic representation of a plasma generator in accordance with a third embodiment of the present invention.

In another linear plasma example, the plasma geometry is achieved by configuring multiple smaller laser sustained plasmas linearly so that the axial dimension is achieved through the additive diameters of the linearly arranged microplasmas. FIG. 4 is a diagrammatic representation of a plasma generator 400 in accordance with an alternative embodiment of the present invention. As shown, the plasma generator includes a plurality of fiber bundles (e.g., 401a and 401b), which each generate pump light (e.g., 402a or 402b). These separate bundles of fibers carrying light that will each excite a separate laser micro-plasma (e.g., 404a or 404b). The figure shows 12 separate fiber bundles that are arranged in a line. However, any suitable number of fiber bundles may be utilized to produce any number of micro-plasmas.

In this example, the center of each plasma is generated on the axis of the (imaginary) cylinder 406. This arrangement allows a mirror to be placed at each cap or end of the cylinder 406 so that the system will have the largest gain for feedback into the laser. Since the gain in the cylinder 406 is related to the product of the number of gain excimers per unit volume times the cross section for stimulated emission and the length of active plasma contained between the two mirrors, the fibers can be selected and positioned so that a length that is equivalent to a photons single round trip gain between the two mirrors is obtained. If this gain exceeds losses (such as absorption, scattering, etc.), a laser is generated from the end of the cylinder 406.

Figure 5:
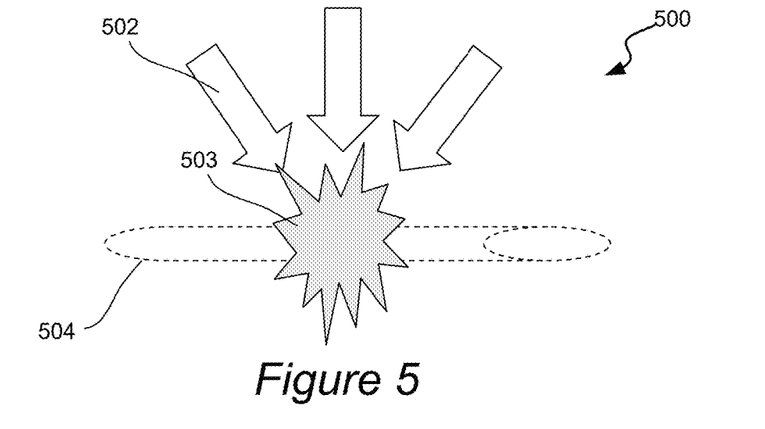
FIG. 5 shows a plurality of fiber bundles that are arranged to aim their light at the same point in accordance with an alternative embodiment.

In contrast, the arrangement of FIG. 5 shows a plurality of fiber bundles (e.g., 502) that are arranged to aim their light at the same point in accordance with an alternative embodiment. The result of this arrangement is the formation of one large ball of plasma 503. In this example, the plasma is not "long" in direction of the cylinder axis 504. This arrangement can have a lower gain and no laser results. However, other arrangements of this configuration may achieve a gain that exceeds losses in the laser cavity as described above with respect to FIG. 2.

At 15 atm these plasmas are roughly 3 eV in temperature, resulting in a plasma number density roughly one tenth that of the high pressure gas cell density. The emission in Xenon near 170 nm has been shown to be roughly 6% of the overall emission. Using a value of $8 \times 10^{-18}$ cm2 for the stimulated emission cross section, the small signal gain for the plasma at 170 nm is then at least 3 for a plasma 1 mm in length. Cell pressures of from 15-10 atm and plasma excitation levels are approximately 100 MW/cm2. These specifications work well for homonuclear excimer production.

Excimer emission using homonuclear molecules results in very short wavelengths. For instance, the fundamental wavelength of the excimer emission for $Xe_2^*$ dimers peaks at 171 nm, 146 nm for $Kr_2^*$ dimers; and 126 nm for $Ar_2^*$ dimers. The excimer laser generation embodiments of the present invention achieve these wavelengths without use of a non-linear material (such as Lithium Triborate (LBO) or Beta Barium Borate (BBO) crystals, etc.) to form harmonics in the laser. Additionally, unlike harmonic-based laser systems, cw excimer laser generators of the present invention can produce a laser having an average power output of at least 5 Watts or more with a given lifetime.

Figure 6:
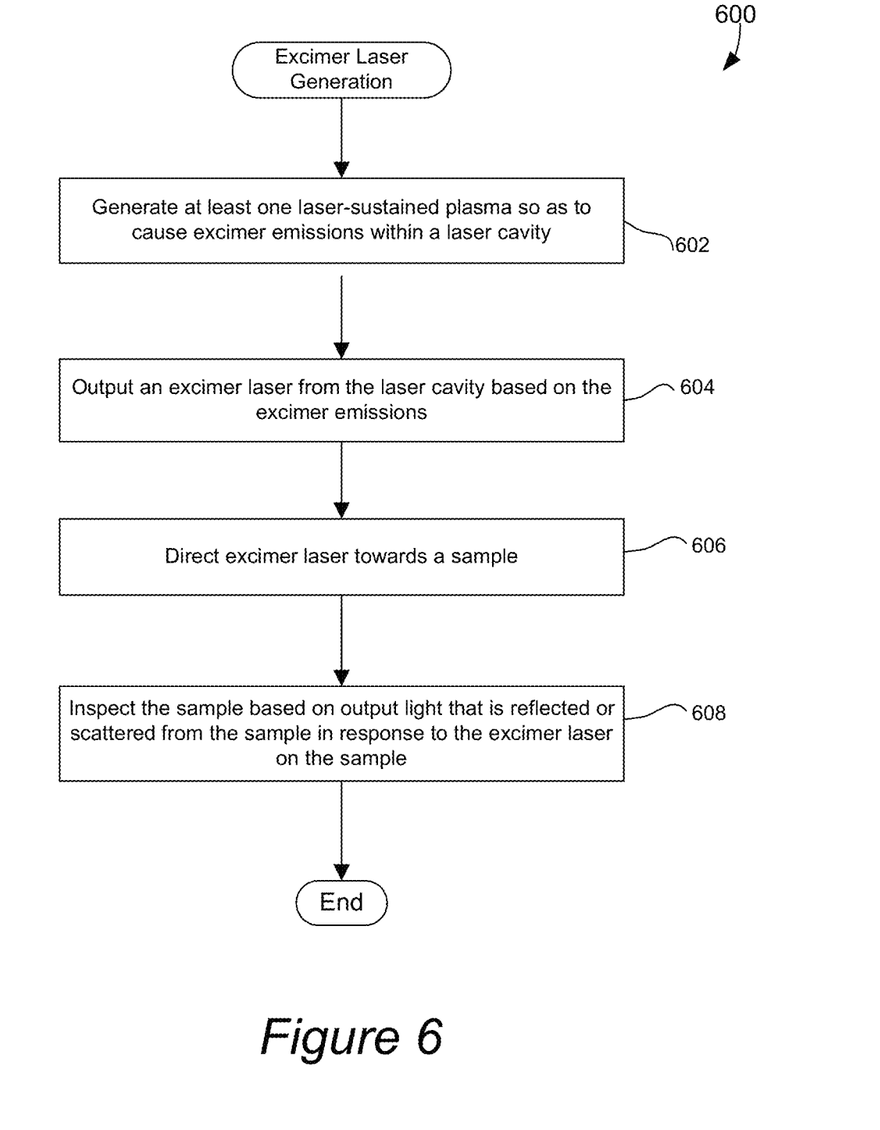
FIG. 6 is a flowchart illustrating a procedure for generating continuous wave (cw) excimer lasers in accordance with one embodiment of the present invention.

FIG. 6 is a flowchart illustrating a procedure 600 for generating cw excimer lasers in accordance with one embodiment of the present invention. Initially, at least one laser-sustained plasma may be generated so as to cause excimer emissions within a laser cavity in operation 602. A laser may then be output from the laser cavity based on such excimer emissions in operation 604. This laser excimer can then be directed towards a sample, such as a semiconductor wafer or reticle, in operation 606. The sample can then be inspected (or a measurement may be taken on such sample) based on the output light that is reflected or scattered form the sample in response to the excimer laser on the sample in operation 608.

System Examples

The laser apparatus described herein may be integrated into any suitable optical system. Example systems may include a photolithography system, semiconductor wafer or reticle inspection or metrology tool, etc.

Figure 7A:
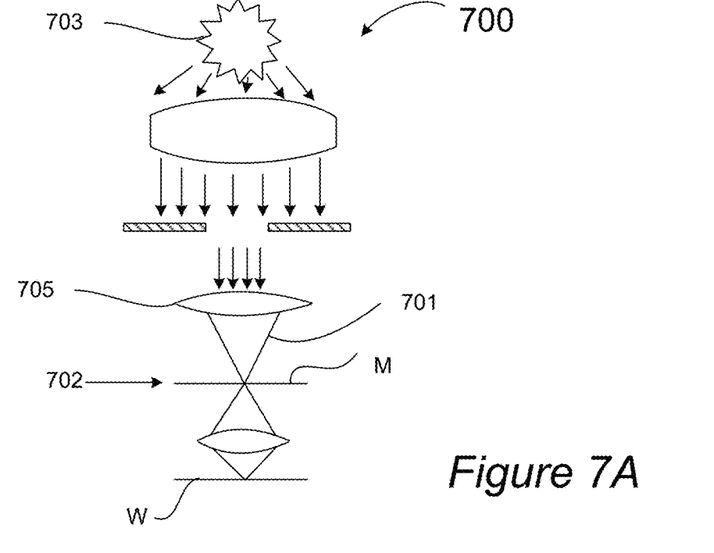
FIG. 7A is a simplified schematic representation of a lithographic system for transferring a mask pattern from a photomask onto a wafer in accordance with certain embodiments.

FIG. 7A is a simplified schematic representation of a typical lithographic system 700 that can be used to transfer a mask pattern from a photomask M onto a wafer W in accordance with certain embodiments. Examples of such systems include scanners and steppers, more specifically PAS 5500 system available from ASML in Veldhoven, Netherlands. In general, an illumination source 703 directs a light beam through an illumination lens 705 onto a photomask M located in a mask plane 702.

The illumination source 703 may take the form of any of the laser apparatus described herein. The illumination lens 705 has a numeric aperture 701 at that plane 702. The value of the numerical aperture 701 impacts which defects on the photomask are lithographic significant defects and which ones are not. A portion of the beam that passes through the photomask M forms a patterned optical signal that is directed through imaging optics 753 and onto a wafer W to initiate the pattern transfer.

Figure 7B:
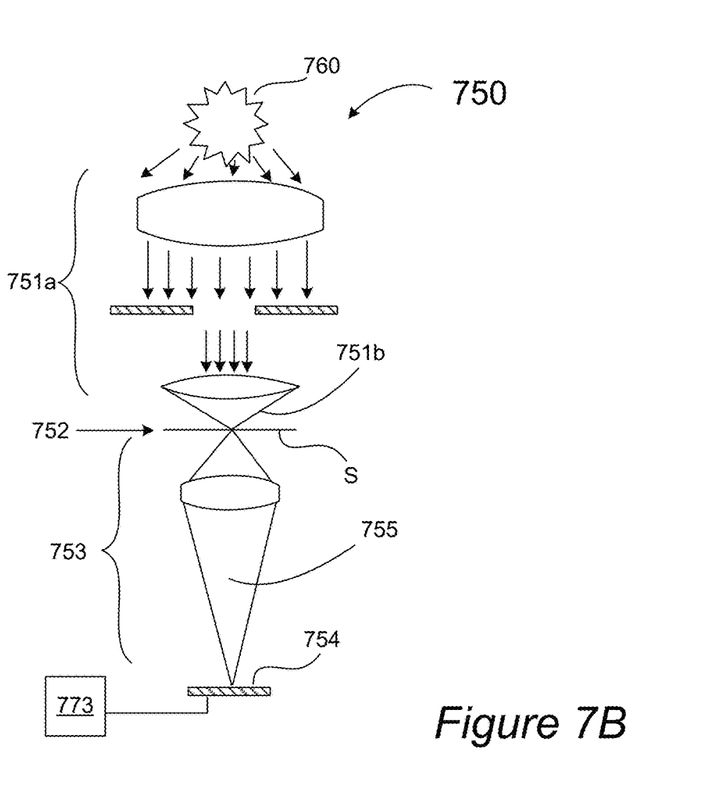
FIG. 7B provides a schematic representation of an inspection apparatus in accordance with certain embodiments.

FIG. 7B provides a schematic representation of an inspection (or metrololgy) system 750 that has an imaging lens 751a with a relative large numerical aperture 751b at a plane 752 in accordance with certain embodiments. The depicted inspection system 750 includes microscopic magnification optics 753 designed to provide, for example, 60-1000× magnification for enhanced inspection. The numerical aperture 751b at the plane 752 of the inspection system is often considerable greater than the numerical aperture 701 at the plane 702 of the lithography system 700, which would result in differences between test inspection images and actual printed images. Each of these optical systems (700, 750) induces different optical effects in the produced images, and such systems can implement techniques for compensating for such effects during an inspection or metrology process.

The laser apparatus herein may be implemented on various specially configured inspection systems, such as the one schematically illustrated in FIG. 7B. The system 750 includes an illumination source 760 producing a laser beam that is directed through illumination optics 751 onto a sample S, such as a photomask or wafer in the plane 752. Another embodiment includes positioning a beam splitter before the wafer in the plane 752. In this embodiment light passes through the beam splitter, to the wafer, and is reflected back to the beam splitter which directs a portion of the wafer image to the sensor which is now positioned at an angle to the incoming and reflected beam paths. The light source can take the form of any laser apparatus described herein so as to generate light that has a wavelength that is below 200 nm. As explained above, the inspection system 750 has a numerical aperture 751b at the plane 752 that may be greater than a plane numerical aperture (e.g., element 701 in FIG. 7A) of the corresponding lithography system. The sample S to be inspected is placed at the plane 752 and exposed to the source.

The patterned image from the sample S is directed through a collection of magnification optical elements 753, which project the patterned image onto a sensor 754. Suitable sensors include charged coupled devices (CCD), CCD arrays, time delay integration (TDI) sensors, TDI sensor arrays, photomultiplier tubes (PMT), and other sensors. In a reflecting system, optical elements would illuminate the sample and capture the reflected image.

The signals captured by the sensor 754 can be processed by a computer system 773 or, more generally, by a signal processing device, which may include an analog-to-digital converter configured to convert analog signals from the sensor 754 into digital signals for processing. The computer system 773 may be configured to analyze intensity, phase, and/or other characteristics of the sensed light beam. The computer system 773 may be configured (e.g., with programming instructions) to provide a user interface (e.g., on a computer screen) for displaying resultant test images and other inspection characteristics. The computer system 773 may also include one or more input devices (e.g., a keyboard, mouse, joystick) for providing user input, such as changing detection threshold. In certain embodiments, the computer system 773 is configured to carry out inspection techniques detailed below. The computer system 773 typically has one or more processors coupled to input/output ports, and one or more memories via appropriate buses or other communication mechanisms.

Because such information and program instructions may be implemented on a specially configured computer system, such a system includes program instructions/computer code for performing various operations described herein that can be stored on a computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In certain embodiments, a system for inspecting a sample includes at least one memory and at least one processor that are configured to perform the following operations: producing test light intensity images of a sample that include a test transmitted image and/or a test reflected image and analyzing the test light intensity images based on a reference image (from an imaged sample or from a design database) to identify defects.

It should be noted that the above diagrams and description are not to be construed as a limitation on the specific components of the system and that the system may be embodied in many other forms. For example, it is contemplated that the inspection or measurement tool may be any of a number of suitable and known imaging or metrology tools arranged for resolving the critical aspects of features of a reticle or wafer. By way of example, an inspection or measurement tool may be adapted for bright field imaging microscopy, darkfield imaging microscopy, full sky imaging microscopy, phase contrast microscopy, polarization contrast microscopy, and coherence probe microscopy. It is also contemplated that single and multiple image methods may be used in order to capture images of the target. These methods include, for example, single grab, double grab, single grab coherence probe microscopy (CPM) and double grab CPM methods. Non-imaging optical methods, such as scatterometry, may be contemplated.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A laser apparatus for generating continuous wave (cw) coherent output radiation having a wavelength below about 200 nm, comprising:
   a chamber for receiving at least a rare gas or rare gas mixtures;
   a pump laser source for generating at least one cw pump laser focused in the chamber for generating at least one laser-sustained plasma having excimer emissions in the chamber; and
   a lens system positioned within the chamber, wherein the lens system provides an optical cavity for forming confocal or unstable resonators inside the chamber to provide feedback to the excimer emissions of the at least one laser-sustained plasma so as to generate at least one continuous wave (cw) laser having a wavelength that is below about 200 nm, wherein the at least one laser-sustained plasma has a shape that substantially matches a shape of the optical cavity, wherein the optical cavity comprises (i) a first mirror formed from materials that transmit wavelengths equal to or higher than the cw pump laser's wavelength and have a high reflectivity at wavelengths that include at least a portion of a wavelength range of the excimer emissions and (ii) a second mirror formed from materials that have a reflectivity at wavelengths that include at least a portion of the wavelength range of the excimer emissions.

2. The laser apparatus of claim 1, wherein the chamber is configured to receive and maintain the rare gas or rare gas mixtures at a pressure that is above about 10 bars.

3. The laser apparatus of claim 1, wherein the rare gas or rare gas mixture comprises one or more of the following gases: Xe, Kr, or Ar.

4. The laser apparatus of claim 1, the laser apparatus further comprising a lasing medium positioned in the optical cavity, wherein the lasing medium is arranged so that excimer excited states are used to collisionally transfer energy to excited atomic states to produce the cw laser from the lasing medium.

5. The laser apparatus of claim 1, wherein the cw laser has an ultraviolet (UV) or vacuum UV wavelength.

6. The laser apparatus of claim 1, wherein the chamber is configured to receive and maintain the rare gas or rare gas mixtures at a pressure that is higher than about 10 atm.

7. The laser apparatus of claim 1, wherein the pump laser source has a wavelength greater than or equal to either about 0.8 to 0.9 μm or about 1 μm and an average power equal to or higher than 1 kW.

8. The laser apparatus of claim 1, wherein the pump laser source is a plurality of fiber bundles of incoherent diodes.

9. The laser apparatus of claim 1, wherein the pump laser source is a plurality of fiber bundles of Yb based active media.

10. The laser apparatus of claim 1, wherein the rare gas has at least a 51% relative fill pressure as compared to any heterodimeric gases in the chamber.

11. The laser apparatus of claim 1, further comprising a pump for flowing the rare gas or rare gas mixtures through the chamber.

12. The laser apparatus of claim 1, wherein the pump laser source and the lens system that provides the optical cavity are arranged to produce excimer emissions in the at least one laser-sustained plasma by having a small signal single pass gain of at least 0.2 so that every photon produced by the excimer emission between the first and second mirrors causes at least 2 photons to be generated.

13. The laser apparatus of claim 12, wherein the gain is based on a concentration number of an excited population times an emission cross section times a length of the optical cavity and active laser medium having a range above 2.

14. The laser apparatus of claim 1, wherein the optical cavity has a length between about 1mn and 10 cm and a diameter having a range of about 100 μm to 3 mm.

15. The laser apparatus of claim 1, wherein the lens system that provides the optical cavity comprises one or more line-narrowing elements.

16. An inspection system for inspecting a photolithographic reticle or wafer for defects, comprising:
a laser apparatus as recited in claim 1;
imaging optics for directing the output beam towards a reticle or wafer;
a detector for receiving a detected signal or image in response to an output beam being reflected from or transmitted through the reticle or wafer in response to the output beam being reflected or scattered from the reticle or wafer; and
a processor and memory that are configured to analyze the detected signal or image to thereby detect defects on the reticle or wafer.

17. A photolithography system for transferring a pattern from a reticle onto a wafer, comprising:
a laser apparatus as recited in claim 1; and
imaging optics for directing an output beam through a reticle onto a wafer.

18. A laser apparatus for generating continuous wave (cw) coherent output radiation having a wavelength below about 200 nm, comprising:
a first second chamber for receiving at least a rare gas or rare gas mixtures;
a pump laser source for generating at least one cw pump laser focused in the first chamber for generating at least one laser-sustained plasma having excimer emissions in the first chamber; a lens system positioned within a second chamber for receiving an extruded portion of the at least one laser-sustained plasma, wherein the lens system provides an optical cavity for forming confocal or unstable resonators inside the second chamber to provide feedback to the excimer emissions of the at least one laser-sustained plasma so as to generate at least one continuous wave (cw) laser having a wavelength that is below about 200 nm, wherein the at least one laser-sustained plasma has a shape that substantially matches a shape of the optical cavity; and
the second chamber having an orifice, wherein the first chamber is configured to have a first pressure and the second chamber is configured to have a second pressure that is substantially lower than the first pressure so as to cause extrusion of an extruded portion of the at least one laser-sustained plasma from the first chamber, through the orifice, to the second chamber.

19. The laser apparatus of claim 18, wherein the first pressure is above about 10 bars and the second pressure is below about 1 torr, wherein the orifice has a diameter between about 30 to 200 µm.

20. The laser apparatus of claim 18, wherein the pump laser source comprises a plurality of fiber bundles for generating a plurality of cw lasers for forming a plurality of laser-sustained micro-plasmas aligned along the length of the optical cavity.

21. A method of generating output radiation having a wavelength below about 200 nm, comprising:
receiving a rare gas or rare gas mixture within a first chamber;
with a pump laser source, generating at least one laser-sustained plasma so as to cause excimer emissions within a laser cavity that forms confocal or unstable resonators inside the first chamber to provide feedback to the excimer emissions, wherein the laser cavity is positioned within the chamber;
outputting an excimer laser from the laser cavity based on the excimer emissions and feedback from the laser cavity;
directing the excimer laser towards a semiconductor sample; and
inspecting the semiconductor sample based on output light that is reflected or scattered from the semiconductor sample in response to the excimer laser on the semiconductor sample,
wherein the at least one laser-sustained plasma has a shape that substantially matches a shape of the optical cavity, wherein the optical cavity comprises (i) a first mirror formed from materials that transmit wavelengths equal to or higher than the cw pump laser's wavelength and have a high reflectivity at wavelengths that include at least a portion of a wavelength range of the excimer emissions and (ii) a second mirror formed from materials that have a reflectivity at wavelengths that include at least a portion of the wavelength range of the excimer emissions.

* * * * *

UNITED STATES PATENT AND TRADEMARK OFFICE
CERTIFICATE OF CORRECTION

PATENT NO. : 9,735,534 B2
APPLICATION NO. : 14/571100
DATED : August 15, 2017
INVENTOR(S) : Solarz et al.

Page 1 of 1

It is certified that error appears in the above-identified patent and that said Letters Patent is hereby corrected as shown below:

In the Claims

Claim 14, Column 12, Line 66, change "1imn" to -- 1mm --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*